Patented Nov. 14, 1922.

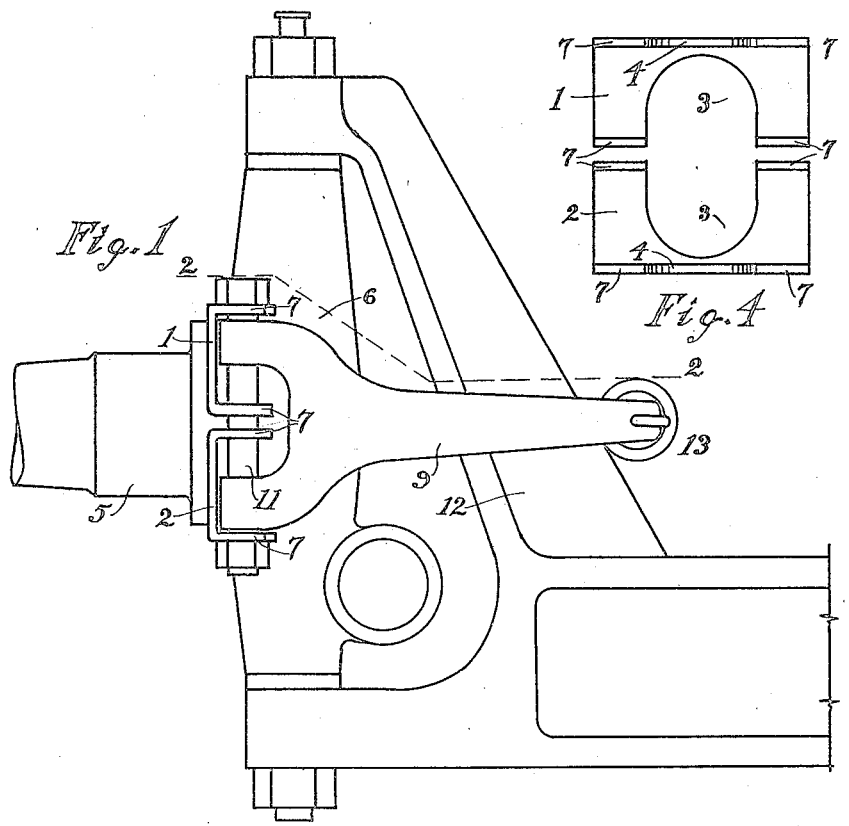
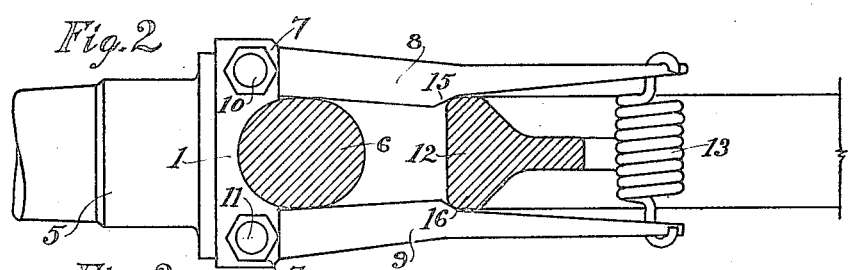
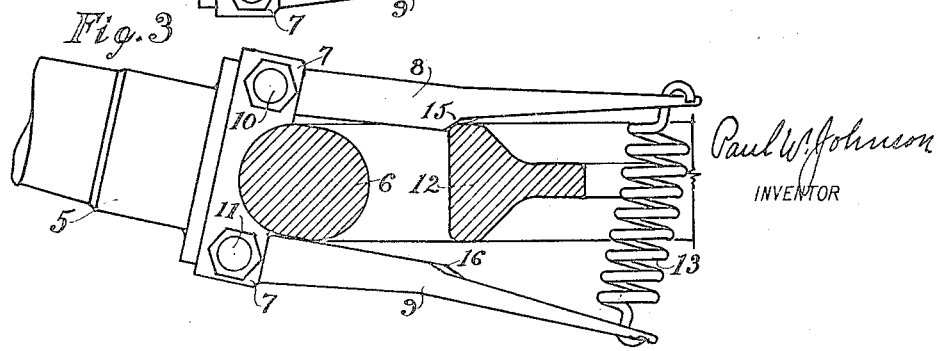

1,435,898

UNITED STATES PATENT OFFICE.

PAUL W. JOHNSON, OF TACOMA, WASHINGTON, ASSIGNOR OF ONE-THIRD TO OLE ERICKSON, OF TACOMA, WASHINGTON.

STEERING STABILIZER FOR AUTOMOBILES.

Application filed February 6, 1922. Serial No. 534,519.

*To all whom it may concern:*

Be it known that I, PAUL W. JOHNSON, a citizen of the United States, residing at the city of Tacoma, in the county of Pierce and State of Washington, have invented a new and useful Improvement in Steering Stabilizers for Automobiles, of which the following is a specification.

My invention relates to devices to be attached to the steering mechanism of automobiles as a means by which the front wheels will be automatically held in line with the rear wheels and thus cause the car to run straight forward should the driver loosen his hold on the steering wheel. Should the steering mechanism become disabled, my invention will prevent the car from turning to the right or left but keep it in a straight forward course. Thus the object of my invention is to so stabilize the front wheels of an automobile when set on a straight road, as to keep it in a straight forward course.

I attain this object by means of the device illustrated in the accompanying drawing in which—

Fig. 1, is an elevation of a spindle body and spindle connectiong yoke of the front axle of an automobile showing my invention attached thereon; Fig. 2 is a top view of Fig. 1 on the line 2—2; showing my invention at rest and holding the spindle in alignment with the axle; Fig. 3 is the same as Fig. 2 with the spindle turned out of alignment with the axle and shows how my invention acts thereon; and Fig. 4 is a view of the hinge parts whereby my invention is fixed on the spindle body.

Similar characters refer to similar parts in the several views.

My invention is designed more particularly for the Ford automobile and other light cars where the spindle body and connecting yokes are similar in form. It comprises two sheet metal pieces 1 and 2 bent L shaped with concave openings 3 and 4, one opening 3 being made to fit on the shoulder of the spindle 5 and the opening 4 made to fit on the adjacent side of the spindle body 6 as shown in the several views of the drawing. Eyelet extensions 7—7 are bent inward from each end of the metal pieces 1 and 2, in which the spring actuated stabilizing arms 8 and 9 are pivotally mounted by the hinge pin bolts 10 and 11. The arms 8 and 9 extend against and tangent to each side of the spindle body and further out they contact each side of the spindle connecting yoke 12 of the front axle, the ends of the arms being connected by the elastic spring 13 as shown in Fig. 2. This tension spring 13 binds the arms 8 and 9 against the sides of the yoke 12 with equal pressure when the spindle 5 is in alignment with the axle 14 and has an automatic elastic tendency to thus hold it. This tendency is made positive by the inclined part of the inner sides of the arms at 15 and 16 where they bear against the sides of the connecting yoke 12. By the means thus described and shown the spindle 5 is automatically held in alignment with the axle 14 and the car will run straight forward and will relieve the driver from a constant strain in holding it in a straight course.

When the driver turns the spindle body and the spindle therewith as shown in Fig. 3, the arm 9 turns with the spindle body and extends the spring 13. The arm 8 yields to the pressure of the connecting yoke 12 and swings out with it as the spring 13 extends. As the spindle is turned to a greater angle than is shown the inclined part 15 will slip by the side of the connecting yoke and but little resistence will be felt by the driver, thus making it easy to steer on a short turn. To turn in the opposite direction, the action of the arms 8 and 9 is reversed, the action being the same as described. When on a straight road the driver turns the spindle in alignment as shown in Fig. 1, and the spring actuated arms 8 and 9 will automatically rest and hold the spindle in alignment with the axle, making it easy to drive on a straight course. My invention will also prevent the car turning or wobbling should the steering mechanism become disabled.

It is to be observed my invention is designed for the right and left spindle body. It is attached directly to the shoulder of the spindle with the arms tangent to and bearing against the sides of the spindle body when the spindle is in line with the axle. It is this bearing on the sides of the spindle body that secures the fulcrum on which the spring actuated arms are alternately made to bear against the connecting yoke when the car is turned to the right or left.

In making my invention as an article of manufacture, I do not limit myself to exact details, but reserve the right to vary the same in form, proportion and strength to secure results in the most effective and practical manner. I also reserve the right to apply a torsion spring on the hinge pin bolts in place of the tension spring shown, should I so desire.

Having described my invention, I claim—

1. A steering stabilizer for automobiles, comprising spring actuated arms pivotally mounted on each side of the spindle body, said arms being tangent therewith and bearing thereon, and said arms extended on each side of and so contacting the spindle connecting yoke as to automatically tend to hold the spindle in alignment with the axle.

2. A steering stabilizer for automobiles, comprising spring actuated arms pivotally mounted on each side of the spindle body, said arms being tangent therewith and bearing thereon, said arms extended on each side of and so contacting the spindle connecting yoke as to automatically hold the spindle in alignment with the axle, and a split hinge member encircling the spindle shoulder and said split hinge member having hinge eyelets in which said spring actuated arms are mounted with hinge pin bolts.

3. A steering stabilizer for automobiles, comprising spring actuated arms pivotally mounted on each side of the spindle body, said arms being tangent therewith and bearing thereon, said arms extended on each side of and so contacting the spindle connecting yoke, and said arms having an inclined face at the points of contact with the said spindle connecting yoke, whereby a positive tendency is secured to hold the spindle in alignment with the axle.

4. A steering stabilizer for automobiles, comprising spring actuated arms pivotally mounted on each side of the spindle body, said arms being tangent with and bearing thereon, said arms extended with an inclined face contact on each side of the spindle connecting yoke and the ends of said arms connected with an elastic spring whereby each is actuated with a tendency to hold the spindle in alignment with the axle, substantially as shown and described.

PAUL W. JOHNSON.